March 24, 1953   B. C. COONS   2,632,552
APPARATUS FOR FEEDING AND ORIENTING PEARS
Original Filed Dec. 5, 1944   4 Sheets-Sheet 1
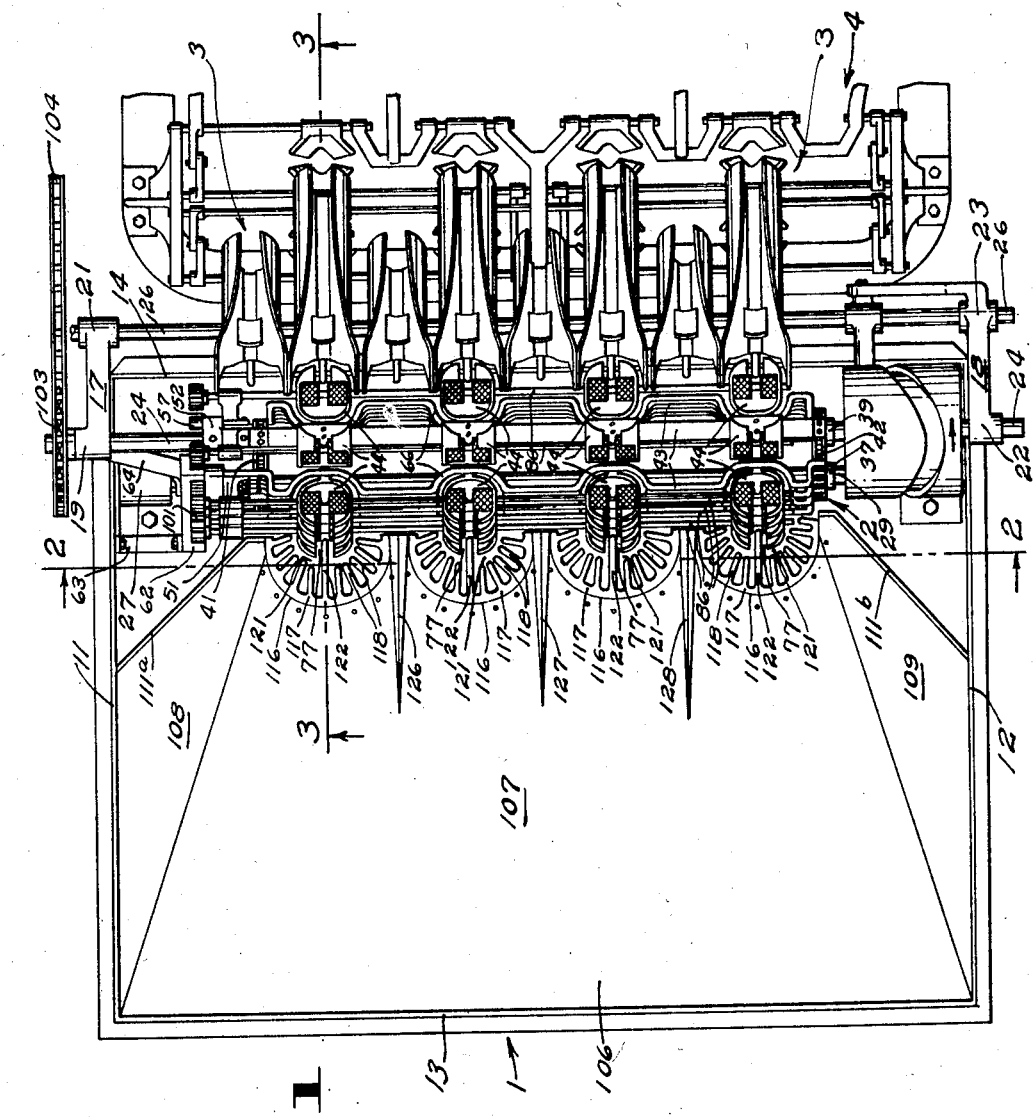
FIG_1
INVENTOR
BURTON C. COONS
BY Philip A. Minnis
Hans F. Hoffmeister
ATTORNEYS March 24, 1953 B. C. COONS 2,632,552
APPARATUS FOR FEEDING AND ORIENTING PEARS
Original Filed Dec. 5, 1944 4 Sheets-Sheet 2
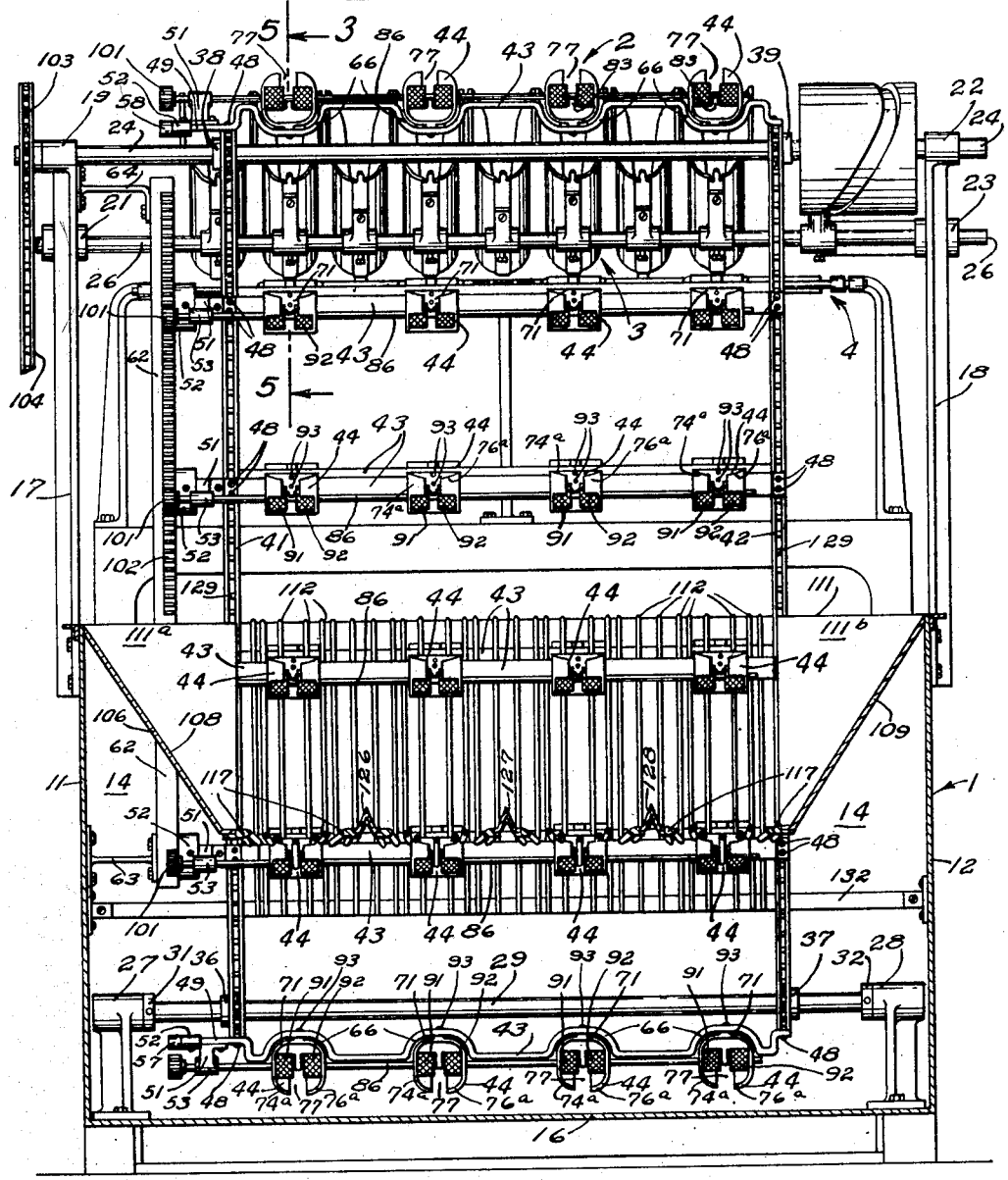
FIG_2
INVENTOR
BURTON C. COONS
ATTORNEYS March 24, 1953  B. C. COONS  2,632,552
APPARATUS FOR FEEDING AND ORIENTING PEARS
Original Filed Dec. 5, 1944  4 Sheets-Sheet 3
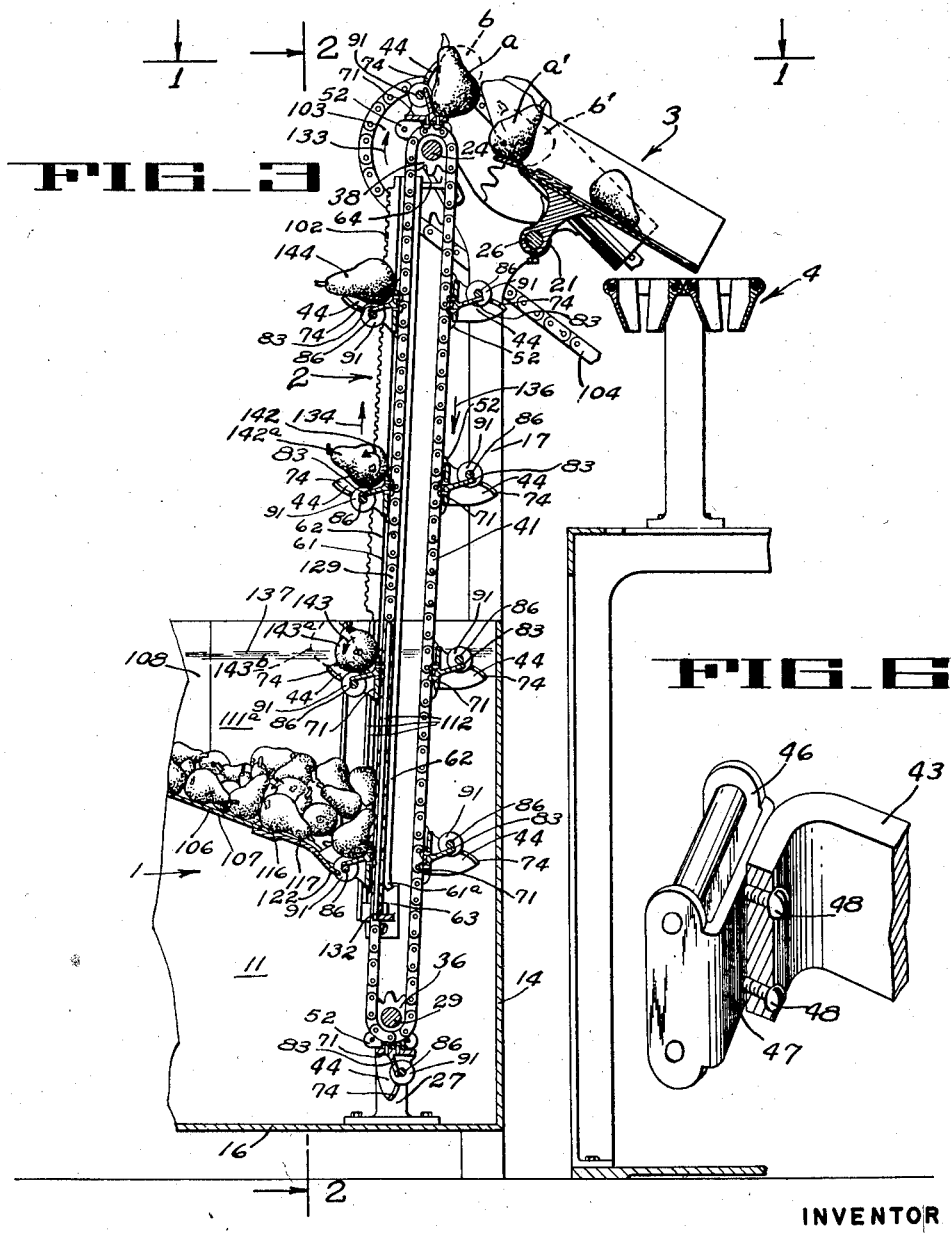
INVENTOR
BURTON C. COONS
ATTORNEYS

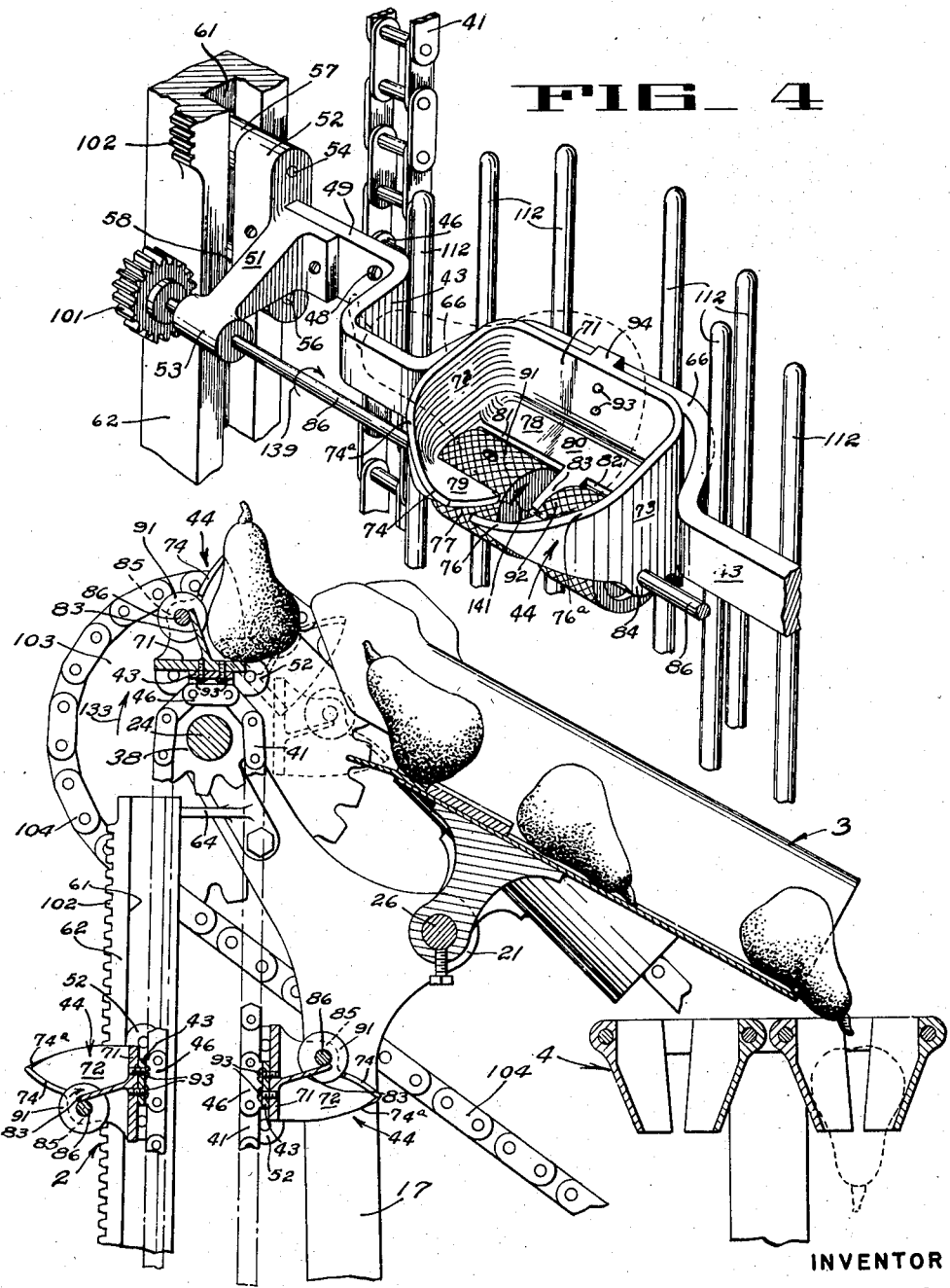

Patented Mar. 24, 1953

2,632,552

UNITED STATES PATENT OFFICE 2,632,552

APPARATUS FOR FEEDING AND ORIENTING PEARS

Burton C. Coons, San Jose, Calif., assignor to Food Machinery and Chemical Corporation, a corporation of Delaware Application July 19, 1947, Serial No. 762,114

11 Claims. (Cl. 198—33)

The present invention relates to certain new and useful improvements in apparatus for feeding and orienting fresh pears.

This application is a division of my copending application, Serial No. 566,694, filed December 5, 1944, now Patent No. 2,581,634, for Pear Feeding and Orienting Apparatus.

One object of the present invention is to provide a pear feeding mechanism for feeding individual pears from a promiscuous mass thereof to a place of use and for arranging the pears in predetermined position during feeding of the same.

Another object is to provide a pear feeding and orienting apparatus which is adapted for handling pears of all sizes and configurations.

Another object is to provide a pear feeding and orienting apparatus of simple and inexpensive construction which requires a minimum amount of floor space.

Other and further objects and advantages of the present invention will become apparent from the following description and drawings in which:

Fig. 1 is a plan view of the pear feeding and orienting mechanism of the present invention in conjunction with a pear feeding or transfer unit of a pear preparation machine.

Fig. 2 is a section of the machine shown in Fig. 1 taken along line 2—2 thereof.

Fig. 3 is a longitudinal section of a portion of the machine shown in Figs. 1 and 2 taken along line 3—3 thereof, some pears being shown in various stages of feeding during the operation of the machine.

Fig. 4 is an enlarged perspective view of a portion of the machine illustrating a feed cup and parts operatively associated therewith.

Fig. 5 is an enlarged longitudinal section of a portion of the machine taken along line 5—5 of Fig. 2.

Fig. 6 is a perspective view of a chain link and a portion of a transverse bar of the elevator mechanism of the machine.

In general, the mechanism of the present invention comprises a tank 1, and a conveyor mechanism 2. The pears are deposited in a promiscuous mass into the tank 1 from which individual pears are fed at predetermined intervals by the conveyor mechanism 2 to a pear handling or treating apparatus such as, for instance, the feed and orienting chute assembly 3. During the conveyance of the pears from the tank 1 to the chute assembly 3 the individual pears are oriented in predetermined manner by the conveyor 2 so that when they are subsequently deposited in such oriented position into the chute assembly 3 they may be finally oriented therein and discharged stem end first therefrom either into stationary fruit receiving pockets of a pear feeding mechanism 4 such as shown in my copending application, Serial No. 507,517, filed October 25, 1943, now Patent No. 2,431,310, for Fruit Handling Machine, or directly into the fruit receiving and holding cups of a pear preparation machine such as, for instance, shown in my United States Patent No. 2,187,075, dated January 16, 1940.

Referring now more specifically to the drawings and especially to Figs. 1, 2 and 3 thereof, it will be noted that the tank 1 of the feeding and orienting mechanism of the present invention is of rectangular construction and comprises side walls 11 and 12, a front wall 13, a rear wall 14 and a bottom 16. Secured to the side walls 11 and 12 of the tank 1, adjacent the rear wall 14 thereof, are standards 17 and 18 provided with bearings 19, 21 and 22, 23, respectively. Rotatably mounted within the bearings 19 and 22 is a transverse shaft 24, while slidably mounted within the bearings 21 and 23 is a transverse shaft 26.

Positioned within the tank 1 and secured to the bottom 16 thereof are bearings 27 and 28 within which a transverse shaft 29 is rotatably mounted which is provided with retaining collars 31 and 32 (Fig. 2). Keyed to the shaft 29 and spaced from each other are sprocket wheels 36 and 37 while keyed to the shaft 24 and spaced with respect to each other are sprocket wheels 38 and 39. The sprocket wheels 36 and 38 are positioned in alignment with each other and trained around the same is an endless elevator chain 41 (Figs. 2 and 3). The sprocket wheels 37 and 39 are also arranged in alignment with respect to each other and trained around the same is an endless elevator chain 42.

Secured to the elevator chains 41 and 42, at equally spaced intervals, are a plurality of transverse bars 43, each one of which is provided with a plurality of pear receiving and orienting cups or buckets 44. To permit attachment of the transverse bars to the sprocket chains 41 and 42 the latter are provided at equal intervals with bar supporting links 46 (Fig. 5) each having a web portion 47 (Fig. 6) to which the transverse bars 43 are secured by means of screws 48.

One end of each transverse bar 43 extends beyond the sprocket chain 41 as shown at 49 in Figures 2 and 4, and carries a bracket 51 provided with a guide block portion 52 and a bearing portion 53. Fixed within the guide block portion 52 are stud shafts 54 and 56 upon which rollers 57 and 58, respectively, are rotatably mounted which are adapted to travel within a guide channel 61 of a stationary guide rail 62 during a portion of the travel of the cross bars 43 more specifically referred to later on. The lower ends of the side walls of the guide channel 61 are flared outwardly at 61a (Fig. 3) to assure entry of the rollers 57 and 58 into the channel during the operation of the machine. The guide rail 62 is secured to the side wall 11 of the tank 1 and the standard 17 by means of brackets 63 and 64, respectively, and is disposed parallel to the sprocket chain 41 (Fig. 3). The transverse bars 43 are bent as shown at 66 to receive the cups 44 in the recesses formed thereby for purposes to be explained later on.

Each of the elevator cups 44 (Fig. 4) comprises a rear wall 71 and side walls 72 and 73 terminating in front wall portions 74 and 76, respectively, which are curved toward and spaced from each other as shown at 77. The upper ends of the side and front walls 72, 74 and 73, 76, of each cup form continuous edges 74a and 76a, respectively, which are gradually forwardly declined toward the free space 77 therebetween (Figs. 2, 4 and 5) for engaging and guiding the neck end of the pear during the orientation of the fruit in the cup. Each cup 44 is further provided with a bottom 78 having a forwardly inclined portion 79 and a rearwardly inclined portion 80. The bottom 78 of each cup is cut away at 81 and 82 (Fig. 4) in such a manner as to provide a downwardly extending tongue 83.

Rotatably mounted within the bearing portion 53 of each bracket 51, previously referred to, and extending through bearing portions 84 and 85 of all of the cups 44 on each transverse bar 43 is a shaft 86 (Fig. 4). Fixed to the shaft 86 below the bottom of each cup are spaced pear positioning rolls 91 and 92 provided with a knurled surface as shown in Figure 4. The rolls 91 and 92 project partially through the cut out portions 81 and 82, respectively, into the cups a sufficient distance above the bottom thereof so as to engage the bulb portion of a pear supported therein. The tongue 83, previously referred to, extends downwardly between the rolls 91 and 92 toward the shaft 86 (Figs. 3, 4, and 5) to prevent entry of the stem of a pear between the rolls behind the shaft 86. The cups 44 are secured to the transverse bars 43 in a position as clearly shown in Figure 4 by means of screws 93 which are screwed into a reinforced portion 94 of the cups.

Keyed to one end of each shaft 86 extending beyond the bearing portion 53 is a pinion 101 adapted to intermesh with a rack portion 102 on the guide rail 62 and forming an integral part therewith.

Keyed to the shaft 24 is a sprocket wheel 103 which is driven by means of a sprocket chain 104 either by a separate motor or directly by the fruit handling or processing machine in conjunction with which the feeding and orienting mechanism of the present invention is used.

Mounted within the tank 1 between the side walls 11 and 12 and the front wall 13 thereof is a fruit supply hopper 106 (Figs. 1 and 2) which comprises a bottom 107, side walls 108, 109 and a rear wall 111 formed by rear wall sections 111a and 111b and a plurality of spaced vertical rods 112. The bottom 107 is declined toward the rear wall 111 and terminates sufficiently in front of the vertical rods 112 to provide an open space for the front run of the elevator chains 41 and 42 and the transverse bars 43 to permit free travel thereof through the hopper 106. The bottom 107 is further provided with semicircular cut out portions 116 (Fig. 1) and mounted on the bottom 107 and extending into said semicircular cut out portions are semicircular grate structures 117, each one of which is provided with a plurality of radially disposed fingers 118 arranged to form semicircular openings 121 in the bottom of the hopper for the passage of the feed cups 44. A long finger 122 of each grate structure 117 is provided to extend into the space 77 (Fig. 1) between the front wall portions 74 and 76 and the orienting rolls 91 and 92 of each cup 44 during its travel past the same. The fingers 122 prevent falling of the fruit from the hopper 106 through the openings 121 into the bottom of the tank 1. The side walls 108 and 109 of the hopper 106 are slanted (Figs. 1 and 2) and partitions 126, 127, and 128 formed in the bottom 107 intermediate adjacent grate structures 117 are provided to guide the fruit in the hopper 106 toward the openings 121 thereof. The partitions 126, 127, and 128 are of inverted V-shaped configuration in cross section as shown in Figure 2.

The guide rods 112 which form a portion of the rear wall of the hopper 106 are positioned behind the front runs 129 of the elevator chains 41 and 42 and are secured at their lower ends to a transversely disposed supporting bar 132 fastened to the side walls 11 and 12 of the tank 1 of the machine. The bar 132 provides the sole support for the guide rods 112 which extend upwardly parallel to the chains 41 and 42 directly behind the transverse bars 43.

The sprocket wheel 103 and shaft 24 are driven in the direction of arrow 133 (Figs. 3 and 5) causing a corresponding rotation of sprocket wheels 38 and 39 to effect travel of the elevator chains 41 and 42 and the transverse bars 43 and cups 44 supported thereby in the direction of arrows 134 and 136 (Fig. 3) around the shafts 24 and 29.

The pears to be oriented and fed by the machine of the present invention are dumped in a promiscuous mass into the supply hopper 106 and gravitate downwardly along the inclined bottom 107 thereof upon the semicircular grate structures 117 from which they are removed one after another by the cups 44 upon the operation of the elevator mechanism 2. To prevent bruising of the pears as they are dumped into the supply hopper 106 and to prevent bridging of the fruit therein the tank 1 and supply hopper 106 are filled with water to the approximate level as shown at 137 (Fig. 3). Since the pears are slightly heavier than the water they will sink therein, and gravitate to the lowest portion of the hopper. However, due to the buoyant effect of the water, the pears accumulated at lowermost region of the hopper and not received within the cups 44 and elevated thereby are easily pushed away without damage or bruising thereof as the cups travel upwardly through the promiscuous mass of pears.

While the elevator mechanism 2 is in operation and while the cups 44 travel upwardly through the hopper 106 a single pear is received in each cup 44 since the size of each cup is such as to accommodate only one pear therein. If a pear enters a cup bulb portion first during the upward travel of the cup through the mass of pears in the hopper 106, as shown in Fig. 3, it will remain therein with the bulb portion of the pear resting in contact with one or both rolls 91 and 92 and with the stem end of the fruit projecting from the cup in any angular position it may assume. The pears so received within the cups are lifted through the mass of pears out of the hopper 106 while the remaining fruit within the hopper slides out of the path of the cups 44 and the pears therein and immediately settles again at the bottom of the hopper above the openings 121 for removal therefrom by the succeeding cups.

During the upward travel of the transverse bars 43, the rollers 57 and 58 of each bar enter the guide channel 61 of the guide bar 62 so that the transverse bars 43 and cups 44 are firmly guided (Fig. 3) during their elevation toward the shaft 24.

After the pears have been received within the cups 44 of each transverse bar 43 and have been lifted thereby from the supply hopper 106, the pinion 101 of the shaft 86 associated with each bar 43 and the transverse row of cups carried thereby engages the teeth of the stationary rack 102 so that during further upward travel of the cups 44 each shaft 86 is rotated in the direction of arrow 139 (Fig. 4) causing a corresponding rotation of the rolls 91 and 92 of each elevator cup 44 in the direction of arrow 141 until the pinion 101 disengages from the rack 102 at the upper end thereof prior to the travel of the transverse bars 43 and cups 44 around the shaft 24.

Therefore, after the fruit has been received within each cup 44 and while the same is elevated in the direction of arrow 134 (Fig. 3), the bulb portion of the pear rests upon one or both rolls 91 and 92 in frictional engagement therewith and upon rotation of the rolls in the direction of arrow 141 during further upward travel of the cups (Fig. 4), the pear in each cup is caused to rotate or turn on its bulb portion, depending upon its original position in the cup, either in the direction of arrow 142 or in the direction of arrow 143 (Fig. 3). When the pear is in a position as shown at 142a in Fig. 3 and rotated in the direction of arrow 142, the stem end of the fruit is swung toward the free ends of the front walls 74 and 76 until the pear assumes a position with its stem end pointing outwardly from the cup toward, or substantially toward, the front end of the machine as shown at 144 in Figure 3. When a pear is in a position as shown at 143a in Fig. 3 and its bulb portion is subsequently rotated in the direction of arrow 143, the neck portion of the pear is caused to roll downward the declined upper edge 74a of the front and side wall portions 72 and 74 of the cup 44 toward the front end thereof whereby the pear is turned sidewise into a position as shown at 144.

After each pear in a transverse row of feed cups 44 has been oriented in substantially predetermined position as shown at 144 (Fig. 3), and while it remains in this position, the pinion 101 disengages from the rack 102 causing cessation of the rotation of the rolls 91 and 92. Thereupon the oriented pears are subsequently discharged from the cups 44 blossom end down as shown in full lines at a and a' in Fig. 3, into the feed and orienting chute assembly 3 previously referred to as the cups are tilted while they travel around the shaft 24.

However, if a pear enters the cup steam end first, the heavy bulb portion of the fruit projects from the cup so that the pear will usually be pushed out of the same by the other fruit in the hopper 106 as it is elevated through the same while another pear enters the cup bulb end first and takes its place.

It sometimes happens, however, that a pear which enters a cup stem end first remains therein and is elevated thereby, such pear is not oriented by the rolls 91 and 92 as above described, since its bulb portion does not contact the rolls. However, in view of the forwardly declined edges 74a and 76a of the elevator cup which engage the bulb portion of the fruit, the bulb portion of the pear will roll or slide downwardly along the same whereby the pear is turned until its bulb portion is disposed substantially above the free space 77 between the free ends of the edges 74a and 76a with the bulb portion of the pear projecting from the front end of the cup as shown in dotted lines at 143b in Fig. 3. Thereupon, as the cups are tilted during their travel around the shaft 24, these pears are discharged sidewise with the bulb portion in leading position into the feed and orienting chute assembly 3 as shown in dotted lines at b and b' in Fig. 3.

The arrangement of the cups 44 within the recesses 66 of the transverse bars 43 disposes the shafts 86 directly below the bars 43 and permits a close spacing of the bars 43 and shafts 86 with respect to the guide rods 112 whereby lodging of the fruit between bars 43 and shafts 86 or between the bars 43 and guide rods 112 and lifting of the fruit thereby out of the hopper 106 is prevented.

From the foregoing it will therefore be seen that the pears deposited in a promiscuous mass into the tank 1 are individually removed therefrom by the conveyor mechanism 2, are oriented in predetermined position during their conveyance and are subsequently discharged in such oriented position at predetermined intervals from the conveyor into the orienting chute assembly 3 or any other fruit handling or treating mechanism for further handling or treatment of the pears thereby.

While I have shown and described a preferred embodiment of my invention, such invention is capable of modification and variation without departing from the spirit and scope thereof as defined in the claims appended hereto.

Having thus described my invention, what I claim as new and desire to protect by Letters Patent is:

1. A pear feeding and orienting mechanism comprising a conveyor for feeding individual pears from a promiscuous mass thereof, a feeding and orienting cup on said conveyor adapted to receive a pear bulb end first therein with the stem end of the pear projecting in angular position therefrom, said cup having a sloping portion at a side thereof adapted to be engaged by the neck of a pear in the cup, and means exposed within the cup and engageable with the bulb end of the pear for rotating the pear in said cup to urge the neck along said sloping portion toward a predetermined position thereon.

2. A pear feeding and orienting mechanism comprising a conveyor for feeding individual pears at predetermined intervals from a promiscuous mass thereof, a feeding and orienting cup adapted to form a seat for a pear and having a camming portion at a side thereof engageable with the neck of a pear seated therein, means for moving said cup through said promiscuous mass to receive a pear bulb end first therein, pear positioning means rotatably mounted on said cup and engageable with the bulb end of the pear therein, and means for rotating the rotatable means to turn the pear in said cup and to move the neck along said camming portion to dispose the stem end of the pear in a predetermined position relative to said cup.

3. A pear feeding and orienting mechanism comprising an endless conveyor for feeding individual pears from a promiscuous mass thereof at timed intervals to a place of use, a plurality of spaced successive cups adapted to receive individual pears bulb end first from said mass, each of said cups having a neck guiding edge portion, and means for orienting the pears during their conveyance in said cups to urge the stem end of each fruit along said guiding edge portion toward a predetermined position, and means for operating the conveyor for discharging the pears blossom end first therefrom.

4. In a pear feeding and orienting mechanism a conveyor for feeding individual pears at predetermined intervals from a promiscuous mass thereof comprising a feeding and orienting cup adapted to form a seat for a pear and having a pear guiding edge engageable with the stem end of a pear seated therein, means for moving said cup through said promiscuous mass to receive a pear bulb end first therein and to separate the same from said mass, rotatable pear positioning means in said cup adapted to engage the bulb portion of the pear therein, and means for rotating said pear positioning means during a part of the travel of said cup to thereby turn the pear in said cup to urge the stem end of the fruit along said pear guiding edge toward a predetermined position.

5. In a pear feeding mechanism a feeding and orienting cup comprising a rear wall and side walls terminating into curved front wall portions, a bottom having a rearwardly inclined portion, and a pair of spaced pear positioning rolls rotatably mounted on said cup and extending into the same forwardly of said rearwardly inclined bottom portion for engaging the bulb portion of a pear received in said cup and for turning the pear upon rotation of the rolls into a position with the stem end of the fruit projecting forwardly of said cup beyond the curved front wall portions thereof.

6. In a pear feeding and orienting mechanism a cup-shaped receptacle having a continuous upper edge interrupted at one point and downwardly declined toward the same, said receptacle being adapted to receive a pear bulb end first therein, and means extending into said receptacle and adapted to engage a pear therein and exert a turning force thereon to thereby cause the neck portion of the fruit to engage the edge and slide downwardly along the declivity thereof until the neck portion of the fruit is disposed substantially above said point with the stem end of the fruit projecting from said receptacle.

7. Arrangement for delivering pears individually and in an aligned position from a promiscuous mass of pears to a place of use, comprising an endless conveyor, a number of cups supported from said conveyor to travel therewith and adapted to receive the bulb end of a pear, a wall of each of said cups being interrupted at a predetermined point of its circumference with its upper edge arranged to dip toward said point, and means for turning a pear seated in said cup during a movement thereof with said conveyor.

8. Arrangement for delivering pears individually and in an aligned position from a promiscuous mass of pears to a place of use, comprising an endless conveyor having an ascending reach arranged to extend through the promiscuous mass of pears; a number of cups supported from said conveyor for travel therewith and adapted to receive the bulb end of a pear, each cup having a retaining wall and a floor, said wall being interrupted at a forward point of its circumference with its upper edge arranged to dip symmetrically toward said interruption, and said floor comprising a pair of coaxially arranged and axially spaced rollers disposed with their common axis transversely to the direction of movement of said conveyor and a stationary floor portion located rearwardly of and ascending obliquely in rearward direction from said rollers; and means for rotating said rollers during a movement of the cups with the conveyor.

9. An orienting cup for a pear feeding conveyor comprising a floor, a roller mounted to exert a turning force on a pear therein, a wall having its upper edge arranged to decline toward a predetermined point thereof and positioned to be engaged by a stem end of a pear in said cup, and means for operating said roller to turn a pear in said cup to urge its neck along said declining edge toward said predetermined point thereof.

10. An orienting cup for a pear feeding conveyor comprising a floor and a circumferential wall, said floor comprising a pair of coaxially arranged and axially spaced rollers and a stationary floor portion ascending obliquely from said rollers in rearward direction, and said wall being interrupted at a point forwardly of and in alignment with the space between said rollers, with its upper edge arranged to dip symmetrically toward said interruption.

11. An orienting cup according to claim 10 comprising a projection extending from said stationary floor portion into the space between said rollers.

BURTON C. COONS.

REFERENCES CITED

The following references are of record in the file of this patent:

UNITED STATES PATENTS

| Number | Name | Date |
| --- | --- | --- |
| 2,220,511 | Carroll | Nov. 5, 1940 |
| 2,265,515 | Carroll | Dec. 9, 1941 |
| 2,298,614 | Carroll | Oct. 13, 1942 |
| 2,406,311 | Ashlock | Aug. 27, 1946 |
| 2,429,991 | Coons | Nov. 14, 1947 |
| 2,502,779 | Coons | Apr. 4, 1950 |